UNITED STATES PATENT OFFICE.

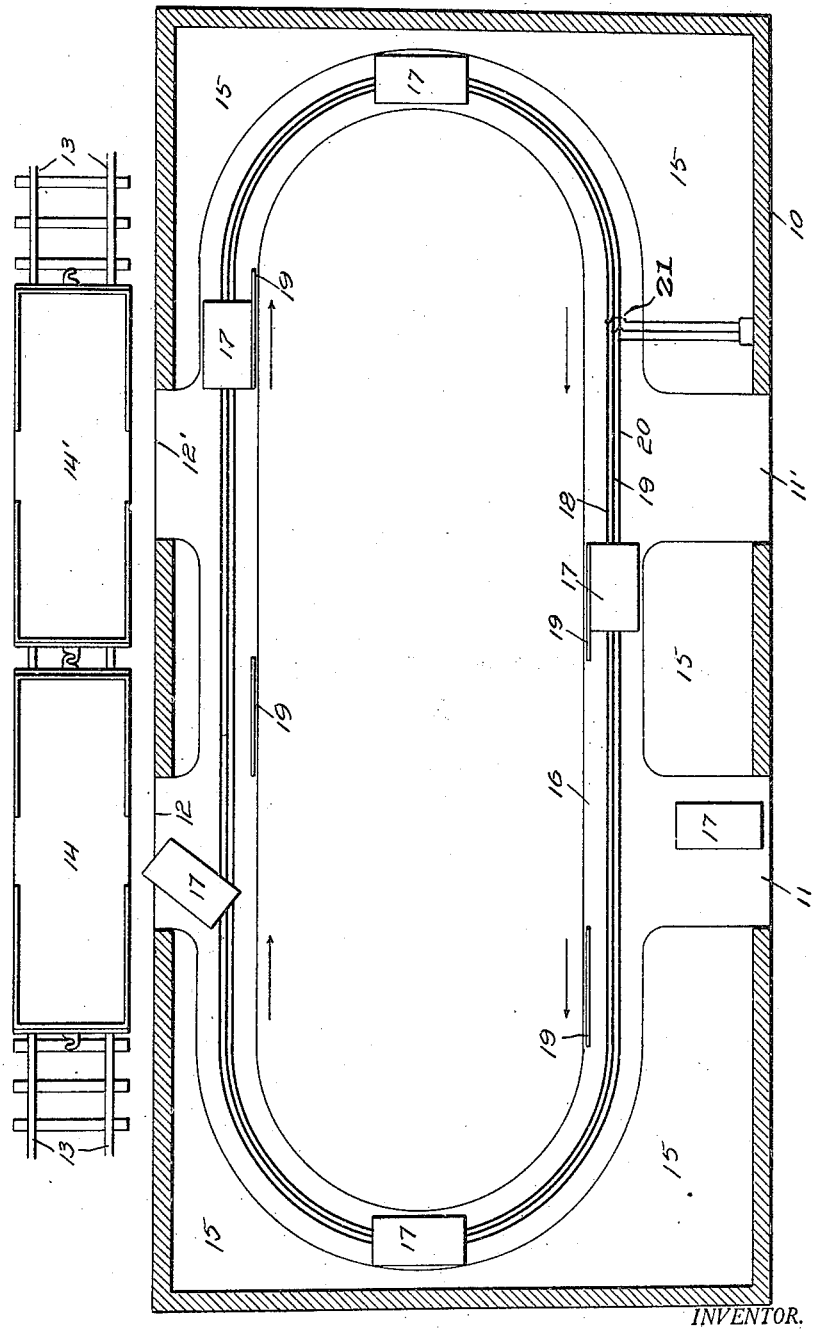

EDWIN B. GRACE AND WILLIAM J. LAFFEY, OF MEMPHIS, TENNESSEE.

FREIGHT-HANDLING SYSTEM.

1,417,242.     Specification of Letters Patent.     Patented May 23, 1922.

Application filed July 16, 1921. Serial No. 485,244.

*To all whom it may concern:*

Be it known that we, EDWIN B. GRACE and WILLIAM J. LAFFEY, citizens of the United States, residing at Memphis, in the county of Shelby and State of Tennessee, have invented certain new and useful Improvements in Freight-Handling Systems, of which the following is a specification.

This invention relates to improvements in freight handling systems generally, and more particularly to a type of such system for the distribution of freight within a warehouse, or the transfer of freight from one point to another within and exteriorly thereof.

The principal object of the invention is to provide for a rapid and systematic loading and unloading of freight cars and the like, and to effect the efficient distribution of the freight, or the transfer thereof from one point to another interiorly and exteriorly of a warehouse or the like.

A further object of the invention is to provide for a system of the class mentioned, and one embodying the use of an electrically operated truck, or trucks, a trolley head carried by the truck or trucks for transmitting current to the motor or motors thereof; and a conductor rail coextensive with the track or runway and adapted to be contacted by the trolley head, all constructed and arranged as disclosed in our copending applications, filed March 18, 1921, Serial Number 453,454; filed July 16, 1921, Serial Number 485,242; and filed July 16, 1921, Serial Number 485,243, respectively.

With the foregoing and other objects in view, the invention resides in the certain new and useful construction and arrangement of parts as will be hereinafter more fully described, set forth in the appended claims, and illustrated in the accompanying drawing, in which:—

The figure is a diagrammatic view, in plan, of the manner of use, or system of operation contemplated for the invention.

Referring to the drawings, the numeral 10 indicates a warehouse or the like having a number of entrances or exits 11, 11′, at one side thereof, and a similar number of entrances or exits 12, 12′, at the other side, the latter preferably leading to and from a railroad siding 13 or the like, whereby articles or materials may be loaded into the railroad cars 14, 14′, from the interior of the warehouse 10 or from wagons, motor trucks, or the like, unloaded at the entrances or exits 11, 11′, and transferred through the warehouse directly from the latter to the said entrances or exits 12, 12′, or for the unloading of the freight cars 14, 14′, for the storage of articles or materials therefrom within the warehouse 10, or for the transfer of the same through the latter to the entrances or exits 11, 11′, for the loading of wagons, motor trucks, or the like for local delivery or distribution to various nearby points. For the puropse of storing certain articles or materials either temporarily or for desired periods of time, or for the sorting out of such articles or materials, one from the other, suitable loading or unloading platforms 15 may be provided at all available points within the warehouse 10, substantially as shown.

For systematically handling the articles or materials within the warehouse 10, and for transferring the same to and from the several entrances or exits 11, 11′, 12, 12′, or to and from the loading and unloading platform 15, a suitable endless runway 16, preferably oval or elliptical in form, is provided, and operable around the same is a plurality of trucks 17, the operation of which being preferably in one direction around the runway only, so as to avoid all possibility of collision therebetween. These trucks 17 may be of any of the well known propelled types, wherein the motive power for the same is self contained, or the same may be driven, and preferably so, from an electrified conductor rail extending on parallel lines with respect to the opposite sides of the runway 16, and medially therebetween. The conductor rail is preferably of a construction embodied in my copending application filed March 18, 1921, and Serial Number 453,454, which consists of three parallel channelways (not shown) housing within the same current conducting elements 18, 19 and 80 of a three wire electrical distributing system, which elements are connected to a suitable source of either direct or alternating current supply as shown, the said elements extending around the runway and terminating as at 21 and immediately adjacent the points of connection of the same with the said source of current supply.

The preferred form of the truck 17 is that of the wheeled type as described and illustrated in my copending application filed July 16, 1921, and Serial Number 485,242, on which is provided a trolley head having three annular contact surfaces, one for each of the conductors carried in the channelways 18, 19 and 20, and from which current is taken for the operation of an electric motor mounted on each of the trucks for driving certain of the wheels thereof.

In the working of the system thus provided, and in one cycle of movement of the truck 17 for the transfer of articles from a loading entrance or exit as for instance the entrance or exit 11, the truck is moved into the entrance or exit 11 and loaded from a wagon or motor truck, and is then pushed inward of the entrance toward a deflector or track guide 19 complemental thereto, which, upon continued pushing of the truck, aids in swinging the latter into position over the channel rails 18, 19 and 20, so that the operator of the truck may then lower the trolley head into the channels and into contact with the electrical conductors carried therein. Just as soon as the trolley is properly engaged, current will flow to the motor and the truck will move around the runway in the direction of the arrows. In making the curves of the runway, the front will be steered either manually or automatically as desired or necessary, and, when the entrance or exit 12 is reached, the operator will raise the trolley head from engagement with the channel rails, and by manipulating a hand steering mechanism, will steer the truck under its momentum outward of the entrance or exit 12, and into position to load the car 14. As soon as the truck 17 is unloaded, it is pushed inward of the entrance 12 as in the first instant, and against the deflector 19 complemental thereto, when it will be again in position to have the trolley head lowered into contact with the conductors carried within the channel rails. In the operation of this system, a number of trucks 17 can be used, since passage one past the other is permitted, by reason of certain of the trucks being moved into the entrances or exits for loading or unloading purposes, and it is to be noted that there is a deflector 19 placed in proper position with respect to the entrances or exits of the warehouse whereby to facilitate the steering of the trucks when they are being manually pushed into position over the current supply rail.

It is well understood that, while the system as a whole, and the operating parts thereof, have been described herein in specific terms of arrangement and construction, various changes in and modifications of the same may be resorted to without departing from the spirit of the invention, or the scope of the claims appended hereto.

Having thus fully described the invention, what is claimed, is:—

1. A system of freight distribution comprising a walled inclosure having entrances and exits leading to and from the interior thereof, an endless runway within the inclosure, electrical conductors of a three wire system of distribution coextensive with said runway, trucks electrically operated from said conductors movable around said runway and manually operable to and from the entrances and exits of the inclosure, and deflectors arranged adjacent each entrance and exit of the inclosure for guiding the trucks into position on said runway.

2. A system of freight distribution comprising a walled enclosure having a plurality of combined entrances and exits leading to and from the interior thereof, an endless runway within the enclosure, electrical conductors of a current distribution system coextensive with said runway, electrically operable trucks movable around said runway and manually operable to and from the entrances and exits of the enclosure, and deflectors arranged to one side of the entrances and exits and the said runway for guiding the trucks into position on the latter.

3. A system of freight distribution comprising a walled enclosure having a plurality of combined entrances and exits leading to and from the interior thereof, loading and unloading platforms within the enclosure and arranged to either side of the entrances and exits thereof, an endless runway within the enclosure and extending immediately adjacent the said platforms, electrical conductors of a current distribution system co-extensive with said runway, electrically operable trucks on said runway and manually operable to and from the entrances and exits of the enclosure, and deflectors arranged to one side of the entrances and exits at the said runway for guiding the trucks into position on the latter.

In testimony whereof, we affix our signatures hereto.

EDWIN B. GRACE.
WILLIAM J. LAFFEY.